| United States Patent [19] | [11] | 4,047,959 |
|---|---|---|
| Guzzardo | [45] | Sept. 13, 1977 |

[54] NONIONIC WATER EMULSIONS OF TRIS(2,3-DIBROMOPROPYL)PHOSPHATE

[75] Inventor: George Paul Guzzardo, Norristown, Pa.

[73] Assignee: Pennwalt Corporation, Philadelphia, Pa.

[21] Appl. No.: 656,564

[22] Filed: Feb. 9, 1976

[51] Int. Cl.$^2$ .......................... C09D 5/18; C09D 5/20
[52] U.S. Cl. ........................................ 106/2; 8/116 P; 106/15 FP; 252/8.1; 427/381; 427/394
[58] Field of Search ............... 106/15 FP, 2; 252/8.1; 260/934, 963; 8/116 P; 427/394

[56] References Cited

U.S. PATENT DOCUMENTS

| 3,544,663 | 12/1970 | Hauptschein et al. | 260/29.6 |
|---|---|---|---|
| 3,654,190 | 4/1972 | Levine | 252/8.1 |
| 3,668,302 | 6/1972 | Boland et al. | 106/15 FP |
| 3,729,434 | 4/1973 | Todd | 106/15 FP |
| 3,792,007 | 2/1974 | Gleason et al. | 106/15 FP |
| 3,856,535 | 12/1974 | Ferguson | 252/8.1 |

*Primary Examiner*—Lorenzo B. Hayes
*Attorney, Agent, or Firm*—Robert G. Danehower

[57] ABSTRACT

Stable nonionic water emulsions of the flame retardant (2,3-dibromopropyl)phosphate are disclosed and claimed. The water emulsions are achieved by use of a ketone solvent and one or more nonionics from selected groups which when used have a sole or combined HLB in the range of about 10 to 14. The stable emulsions are compatible with all water repellents including the cationic fluorochemical oil and water repellents.

9 Claims, No Drawings

NONIONIC WATER EMULSIONS OF TRIS(2,3-DIBROMOPROPYL)PHOSPHATE

BRIEF DESCRIPTION OF INVENTION

This invention is directed to stable flame retardant emulsions of tris(2,3-dibromopropyl) phosphate which are compatible with fluorochemical oil and water repellents. When diluted with water and then padded on textiles these emulsions impart excellent flame retardancy. When used in conjunction with a oil and water repellent they provide oil and water repellency in addition to flame retardancy.

The use of tris(2,3-dibromopropyl) phosphate as a flame retardant has been disclosed in the art. For example, Todd in U.S. Pat. No. 3,729,434 discloses an aqueous emulsion in which the tris(2,3-dibromopropyl) phosphate is emulsified with a blend of an oil soluble metal sulfonate and a polyoxyethylene ether having a hydrophile-lipophile balance (HLB) of 10–14 in conjunction with the use of a water immiscible solvent. These emulsions have the serious disadvantage that they are not compatible with many commercial fluorochemical oil and water repellents, especially those based on cationic surfactant systems such as DuPont's ZEPEL or Pennwalt Corporation's PENTEL. Moreover, the high concentration of anionic surfactant in the Todd emulsion does not lend itself to water repellency.

Ferguson in U.S. Pat. No. 3,856,535 discloses emulsions of tris(2,3-dibromopropyl) phosphate in which the emulsifying agent is a blend of an ethoxylated or propoxylated fatty acid ester of glycerol having an average molecular weight of 6,500 to 14,000 with lower molecular weight fatty acid ester of glycerol, sorbitol or sorbitan or their ethoxylated or propoxylated derivatives having a molecular weight in the range of 1000 to 6,500. Ferguson found that he required an HLB range of 14.5–18.7 for his emulsifier and in addition, that he required a concentration of 10% by weight emulsifier. While suitable for flame retardancy applications such high HLB values and such high detergent concentrations could not be used successfully in conjunction with a water repellent. Poor hydrostatic water pressure values would be the result. A flame retarding composition combined with a water and oil repellent are essential for treating fabrics which are used for tents and awnings. In such uses water repellency is of equal or greater importance than flame retardancy.

I have now discovered a nonionic aqueous emulsion system of tris(2,3-dibromopropyl) phosphate which is both stable and compatible with either anionic, cationic or nonionic fluorochemical oil and water repellents. These nonionic emulsions consist essentially of about 40 to 50 percent by weight of tris(2,3-dibromopropyl) phosphate flame retardant, about 6 to 12 percent by weight of one or more $C_5$ to $C_7$ aliphatic or alicyclic ketones, about 3 to 6% by weight of one or more particular nonionic surfactants having an average HLB value in the range of 10 to 14 and the balance water to make 100 percent. These emulsions impart excellent flame retardancy and when combined with a fluorochemical oil and water repellent give good water repellency to fabrics with high hydrostatic water pressure values.

DETAILED DESCRIPTION OF INVENTION

The tris(2,3-dibromopropyl) phosphate flame retardant is readily available commercially or it can be prepared by reacting 2,3-dibromopropanol with phosphoric acid, phosphorus oxychloride, phosphoric acid esters or phosphorus pentoxide in appropriate solvents. The tris(2,3-dibromopropyl) phosphate is used in the emulsions at a concentration of about 40 to 50 percent by weight.

The emulsifying agents of my invention are selected from three classes of nonionic emulsifiers. One or more of the same or different nonionics can be used to emulsify the flame retardant.

The emulsifiers which are satisfactory for my invention must have a hydrophile-lipophile balance (HLB) within the range of about 10 to 14. If only a single emulsifier is used it must be within the range of about 10 to 14. If more than one emulsifier is used the HLB values can range above or below the range of about 10 to 14 provided the blend of emulsifiers has an HLB value within the range of about 10 to 14.

The hydrophile-lipophile balance provides one means of measuring the size and strength of the hydrophilic and lipophilic groups of the surfactant and is measured on a scale of 0 to 30. An emulsifier which is lipophilic is characterized by a low HLB number (below 10) and one that is hydrophilic by a high HLB number (above 10). In the case of the polyoxyethylene glycol ethers the more ether linkages the greater the hydrophilic tendency and consequently the higher the HLB value. The HLB range is significant only in relation to the blend described herein since not all surfactants with the same HLB give the same results. Since their chemical type may also be different, the HLB of mixtures or surfactants can be calculated by algebraic addition. The HLB can also be measured by standard laboratory procedures and for most known surfactants the HLB values are published information.

The first class of emulsifiers which are useful in my invention are the sorbitan fatty acid esters and the ethoxylated sorbitan fatty acid esters in which the fatty acid groups can range from about $C_{12}$ to $C_{15}$ and the ethylene oxide groups, if present, range from about 4 to 20 moles or units. Examples of nonionics in this class are sorbitan monolaurate, sorbitan trioleate, sorbitan monopalmitate, ethoxylated sorbitan monolaurate having 20 ethylene oxide units, ethoxylated sorbitan monolaurate having 4 ethylene oxide units, ethoxylated sorbitan trioleate having 20 ethylene oxide units and ethoxylated sorbitan monostearate having twenty ethylene oxide units. Nonionics of this class are variable from I.C.I. America under the trademarks TWEEN and SPAN.

The second class of nonionic emulsifiers useful in my invention are the ethoxylated glycol tallates in which the ethylene oxide content can range from about 4 to 20 moles or units. An example of this class is polyoxyethylene glycol tallate having about 15 moles of ethylene oxide.

The third class of nonionic emulsifiers are the series of polyoxyethylene polyoxypropylene glycols sold under the trademarks PLURONIC L and PLURONIC F by BASF Wyandotte. These emulsifiers are formed by ethoxylating a condensate of propylene oxide and ethylene glycol. The ethylene oxide content added to the condensate will range between about 4 to 20 moles or units and the molecular weight of the glycols will range from about 1100 to 15,000. Suitable PLURONICS which I have used in may emulsions are F68, L43, L63, L64 and L121. The trademarks with the L designation are liquids while the F68 is a solid.

The nonionic emulsifiers are used at a concentration of about 3 to 6 percent by weight in my emulsion concentrates.

The flame retardant phosphate esters used in my invention are very difficult to emulsify in water and form stable compositions. In order to assist the emulsifiers in forming stable emulsions, I have found it necessary to employ about 6 to 12 percent by weight of a ketone solvent. The ketones useful in making the stable emulsions of my invention are the $C_5$ to $C_7$ aliphatic and alicyclic ketones.

Examples of suitable ketone solvents are methylisobutyl ketone, methylisopropyl ketone, methyl normal butyl ketone, methyl normal propyl ketone, cyclopentanone, diethyl ketone and 2-heptanone.

The final ingredient of my flame retarding emulsions is water which is added to balance the composition at 100% by weight. Generally the water will be present at about 51 to 32 percent by weight.

Emulsion preparation is conveniently carried out at room temperature in standard homogenizing apparatus. The ingredients are added to the homogenizer and homogenization is continued until a stable emulsion is obtained. This takes place in about 10 to 30 minutes. The stability of an emulsion is determined by allowing it to remain quiescent in a vertical glass container and observing any phase separation after 24 hours or any longer period. The emulsions are readily pourable and dispersable in all proportions in typical pad bath formulations.

For imparting flame retardancy to textiles the emulsions discribed above are dispersed with water in a pad bath for wetting the fabrics. The pad bath composition is formulated to give about 40 to 70% by weight of the tris(2,3-dibromopropyl) phosphate emulsion in water. The fabric moves through the pad bath, usually at ambient temperature, and exits through squeeze rollers. The speed of the fabric and the pressure on the squeeze rollers determine the amount of retention of the pad bath composition on the fabric. Generally, the pad bath is regulated to obtain about a 70 to 80% by weight liquid pick-up based on the dry weight of the fabric.

After leaving the pad bath, the fabric goes to a dryer where the water and ketone are evaporated leaving the tris(2,3-dibromopropyl) phosphate distributed throughout the fabric. The pad bath is operated to leave at least about a 10% weight increase on the fabric on a dry basis. This is referred to in this application and claims as an effective amount of flame retardant. Preferably, the weight increase will be about 30 percent on a dry basis. Air temperatures for hot air dryers are generally within the range of about 275° to 300° F.

The unique feature of my nonionic emulsions is that they are compatible with all types of oil and water repellents in fabric treating amounts while retaining long lasting emulsion stability. Cationic, anionic and nonionic repellents can be used. By combining the repellent with the flame retardant, I am able to treat the fabrics and impart flame retardant properties as well as oil and water repellency. Two of the most effective of the oil and water repellents are the cationic fluorochemical oil and water repellents sold by DuPont under the trademark ZEPEL and by Pennwalt Corporation under the trademark PENTEL. ZEPEL is manufactured in accordance with the disclosure in U.S. Pat. Nos. 3,256,230 and 3,378,609 while the preparation of PENTEL is disclosed in U.S. Pat. Nos. 3,544,663.

The tris(2,3-dibromopropyl) phosphate emulsion of this invention may typically be used in 40–70 parts by weight (usually about 50% active tris) with about 10 to 20 parts by weight of an oil and water repellent (about 20% solids), about 2.5–4.0 parts of ammonium dihydrogen phosphate and water to make up a total of 100 parts by weight. Fabrics are usually treated to provide about 10–30 percent tris(2,3-dibromopropyl) phosphate about 1–5 percent oil-water water repellent and about 2.5 to 4.0 percent solid ammonium dihydrogen phosphate based on the dry weight of the fabric.

The presence of the oil and water repellent in the emulsion concentrate does not change the manner of treating fabrics in the pad bath. However, if a fluorochemical oil and water repellent is combined with the flame retardant higher drying temperatures are required to cure the fluorochemicals while on the fabric. Final air drying temperatures of 275° to 325° F. are generally satisfactory for curing.

The best mode of practicing my invention will be apparent from a consideration of the following examples.

EXAMPLE 1

A preferred embodiment of this invention is the preparation of the flame retardant emulsion using a 31.25/68.75 blend of PLURONICS F68 and L121 in the following proportions.

| Ingredient | Percent Weight |
|---|---|
| Tris(2,3-dibromopropyl)phosphate | 50 |
| PLURONICS F68 (mol wt. 8350) and L121 (31.25/68.75) | (mol wt 4400) 3 |
| Methylisobutyl ketone | 6 |
| Water | 41 |

After homogenization and storage this emulsion shows only 3/16 inch phase separation after 6 days of storage. The individual surfactant HLB values are F68-29, L121-5 while the blend in the proportions used have an HLB of 12.5.

EXAMPLE 2

The emulsions of my invention are compatible with water repellents of all types. Formulation ranges are shown below:

| Ingredient | Percent by Weight |
|---|---|
| Emulsion of Example 1 | 40–70 |
| Fluorochemical Oil/Water Repellent (PENTEL GH-28) | 10–20 |
| Ammonium Dihydrogen Phosphate | 2.5–4.0 |
| Water | to make 100% |

The ammonium dihydrogen phosphate is useful in preventing after-glow. The above formulations show less than 5% phase separation after standing 24 hours in an unagitated pad bath, and agitation readily restores complete homogeneity.

Application of these formulations to tent fabrics made of cotton, polyester, or blends impart flame retardancy as well as oil/water repellency properties and resistance to water penetration. For example, tent fabrics treated with these formulations give superior hydrostatic pressure ratings typically 24 cm. or more. The test (AATCC Test Method 127-1968) involves forcing water under pressure through a fabric just until water starts to pass through it. Good results are also obtained in the Bag Test (Army Code LP/P DES-48-68) which requires that a 12 × 12 inch sample which when formed into a bag does not leak over a 24-hour period when it contains 250 ml. of water.

EXAMPLES 3-6

The following ingredients are mixed and homogenized in standard equipment to give stable emulsions of this invention:

| Ingredient | Percent by Weight | | | |
|---|---|---|---|---|
| Example No. | 3 | 4 | 5 | 6 |
| Tris(2,3-dibromo-propyl)phosphate | 50 | 50 | 50 | 50 |
| PLURONICS F68/L121 (31.25/68.75) | 3 | 6 | 3 | 6 |
| Methylisobutyl ketone | 6 | 6 | 12 | 12 |
| Water | 41 | 38 | 35 | 32 |

EXAMPLE 7

Pad baths were prepared by adding 70 parts each of the emulsions of Examples 3 to 6 to 12.5 parts water, 2.5 parts $NH_4H_2PO_4$ and 15.0 parts PENTEL. These pad baths were used to treat swatches of 10.38 oz/yd² undyed cotton (white greige) under the following conditions:

| Wet pick-up: | 70-80% |
|---|---|
| Drying: | 230° F./9 minutes |
| Curing: | 302° F./2 minutes |

The treated fabrics were tested for flame retardancy using the CPAI-84 Flame Test. For this weight fabric the test allows a maximum char length of 4 inches. The fabrics are also tested by the previously described Bag Test and Hydrostatic Pressure Tests as well as oil repellency using the AATCC Method 118-1972 and Spray Rating Test using AATCC Method 22-1974. Stability of the pad bath was observed by measuring the amount of separation of 200 g in 24 hours at room temperature. The results are summarized in Table I.

TABLE I

| Example | Shelf Stability(a) | Oil Repellency Rating | Spray Rating | Hydrostatic Pressure | Pad Bath Stability(b) | Flame Retardancy Char Length, Inches CPAI-84 | Bag Test |
|---|---|---|---|---|---|---|---|
| 3 | 3/16 | 6 | 70+ | 25.7 | 1/8 | 2-15/16 | No leak |
| 4 | 3/16 | 5 | 70+ | 24.2 | 1/8 | 2-7/8 | No leak |
| 5 | 3/16 | 5+ | 70+ | 25.1 | 1/8 | 2-5/16 | Leak after 24 hours |
| 6 | 1/8 | 5+ | 70+ | 24.0 | 1/8 | 2-15/16 | Leak after 24 hours |

(a)inches separation after 6 days - refers to emulsion alone.
(b)inches separation after 24 hours - refers to pad bath.

EXAMPLE 8 and 9

Emulsions similar to the formulations of Examples 3 to 6 were prepared except the ketone solvent was omitted. The adverse effect on emulsion stability is readily observed.

| Ingredient | Percent by Weight | |
|---|---|---|
| Example | 8 | 9 |
| Tris(2,3-dibromopropyl) phosphate | 50 | 50 |
| PLURONICS F68/L121 (31.25/68.5) | 6.75 | 13.5 |
| Methylisobutyl ketone | 0 | 0 |
| Water | 43.25 | 36.5 |
| Shelf stability (inches of separation after 6 days) | 1 | 1¼ |

EXAMPLE 10 to 13

The stabilities of emulsions with various nonionic emulsifiers of this invention are shown below:

| Ingredient | Parts by wt. | | | |
|---|---|---|---|---|
| Example No. | 10 | 11 | 12 | 13 |
| Tris(2,3-dibromopropyl)phosphate | 50 | 50 | 50 | 50 |
| Polyoxyethylene (20 units) sorbitan monolaurate (Tween 20)/sorbitan monolaurate (Span 20) (47.6/52.4) | 3 | — | — | — |
| Polyoxyethylene (4 units) sorbitan monolaurate (Tween 21)/sorbitan trioleate (Span 85) (65.5/34.5) | — | 6 | — | — |
| Polyoxyethylene (20 units) sorbitan trioleate | — | — | 6 | — |
| Polyoxyethylene (15 units) glycol tallate (ETHOFAT 242/25) | — | — | — | 3 |
| Methylisobutyl ketone | 6 | 12 | 12 | 12 |
| Water | 41 | 32 | 35 | 35 |
| Shelf Stability-(inches of separation after Days) | ¼"/6 | none/10 | none/10 | ¼"/4 |

The HLB values of the individual emulsifiers are TWEEN 20-16.7, TWEEN 21-13.3; SPAN 20-8.6, SPAN 85-1.8, ETHOFAT 242/25-12.2, TWEEN 85-11.0.

EXAMPLE 14 to 16

The following Examples show various blends of nonionics which provide stable aqueous emulsions of tris (2,3-dibromopropyl) phosphate.

| Ingredient | HLB | Parts by Weight | | |
|---|---|---|---|---|
| Example No. | | 14 | 15 | 16 |
| Tris (2,3-dibromopropyl) phosphate | — | 100 | 100 | 100 |
| Methylisobutyl ketone | — | 12 | 12 | 12 |
| Pluronics F68/L121 in weight ratio of 5/19 | 10.0 | 11 | — | — |
| Pluronics F68/L121 in weight ratio of 31.25/68.5 | 12.4 | — | 12 | — |
| Pluronics F68/L121 in weight ratio 9/15 | 14.0 | — | — | 15 |
| Water | — | 77 | 76 | 73 |
| Shelf Stability (inches of separation after six Days) | — | 1/16 | 3/16 | 1/16 |

EXAMPLES 17 to 18

The following Examples give additional types of ketones that may be used.

| Ingredient | Parts by Weight | |
| --- | --- | --- |
| Example No. | 17 | 18 |
| Tris (2,3-dibromopropyl) phosphate | 50 | 50 |
| Pluronics F68/L121 in weight ratio 31.25/68.5 | 6 | 6 |
| 2-Pentanone | 6 | — |
| 2-Heptanone | — | 6 |
| Water | 38 | 38 |

I claim:

1. The textile flame retardant emulsion consisting essentially of:
   tris(2,3-dibromopropyl) phosphate — about 40 to 50%, one or more ketones selected from the group consisting of $C_5$ to $C_7$ aliphatic and alicyclic ketones - about 6 to 12%, and about 3 to 6% of one or more nonionic surfactants having a hydrophile-lipophile balance of 10 to 14 selected from the group consisting of:
   a. sorbitan fatty acid esters and ethoxylated sorbitan fatty acid esters in which the ethylene oxide content ranges from about 4 to 20 moles and the fatty acids range from about $C_{12}$ to $C_{15}$,
   b. polyoxyethylene glycol tallate in which the ethylene oxide content ranges from about 4 to 20 moles, and
   c. ethoxylated condensate of ethylene glycol and propylene oxide in which the ethylene oxide content ranges from about 4 to 20 moles and the molecular weight ranges from about 1100 to 15,000.
   and water to make 100%, all percentages being by weight.

2. The emulsion concentrate of claim 1 in which the ketone is methylisobutyl ketone.

3. The emulsion concentrate of claim 1 in which the nonionic surfactant is polyoxyethylene sorbitan monolaurate having about 20 moles of ethylene oxide.

4. The emulsion concentrate of claim 1 in which the nonionic surfactant is a blend of ethoxylated condensates of ethylene glycol and propylene oxide having a hydrophile-lipophile balance of 12 to 13.

5. The textile flame retardant-oil and water repellent formulation consisting essentially of:
   tris (2,3-dibromopropyl) phosphate emulsion of claim 1 in about 40–70 percent, aniomic, cationic and nonionic fluorochemical oil and water repellent in about 10–20 percent, ammonium dihydrogen phosphate in about 2.5 – 4.0 percent, and water to make up 100%, all percentages being by weight.

6. The composition of claim 5 in which the oil and water repellent is a cationic fluorochemical.

7. The process of rendering textiles flame retardant by treating textiles with the emulsion of claim 1 and thereafter drying the textiles to leave about 10 to 30% by weight of tris (2,3-dibromopropyl) phosphate on the textiles.

8. The process of rendering textiles flame retardant and oil-water repellent with a hydrostatic pressure rating of at least 24 cm. by treating textiles with the composition consisting essentially of tris (2,3-dibromopropyl) phosphate emulsion of claim 1 in about 40–70 percent, anionic, cationic and nonionic fluorochemical oil and water repellent in about 10–20 percent, ammonium dihydrogen phosphate in about 2.5–4.0 percent, and water to make up 100 percent, all percentages being by weight, and thereafter, drying to textiles to leave about 10 to 30 percent tris (2,3 -dibromopropyl) phosphate and about 1 to 5 percent anionic, cationic or nonionic fluorochemical oil and water repellent on the textiles, all percentages based on the dry weight of the textiles.

9. The process of claim 8 in which the fluorochemical oil and water repellent is a cationic fluorochemical oil and water repellent.

* * * * *